US009304609B2

(12) United States Patent
Nakao (10) Patent No.: US 9,304,609 B2
(45) Date of Patent: Apr. 5, 2016

(54) SUSPENDING TABLET COMPUTER BY STYLUS DETECTION

(71) Applicant: LENOVO (SINGAPORE) PTE, LTD, New Tech Park (SG)

(72) Inventor: Takenobu Nakao, New Tech Park (SG)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 97 days.

(21) Appl. No.: 13/797,867

(22) Filed: Mar. 12, 2013

(65) Prior Publication Data

US 2014/0267062 A1     Sep. 18, 2014

(51) Int. Cl.
| G06F 3/033 | (2013.01) |
| G06F 3/0354 | (2013.01) |
| G06F 3/046 | (2006.01) |
| G06F 3/044 | (2006.01) |
| G06F 3/041 | (2006.01) |
| G06F 1/32 | (2006.01) |

(52) U.S. Cl.
CPC .......... *G06F 3/03545* (2013.01); *G06F 1/3215* (2013.01); *G06F 1/3262* (2013.01); *G06F 3/041* (2013.01); *G06F 3/044* (2013.01); *G06F 3/046* (2013.01)

(58) Field of Classification Search
None
See application file for complete search history.

(56) References Cited

U.S. PATENT DOCUMENTS

| 4,878,553 | A | | 11/1989 | Yamanami et al. | |
| 5,402,151 | A | * | 3/1995 | Duwaer | G06F 3/044 178/18.05 |
| 6,681,333 | B1 | | 1/2004 | Cho | |
| 2002/0163511 | A1 | * | 11/2002 | Sekendur | 345/179 |
| 2006/0284854 | A1 | * | 12/2006 | Cheng | G06F 3/03545 345/173 |
| 2008/0222542 | A1 | * | 9/2008 | Woolf et al. | 715/764 |
| 2010/0110021 | A1 | * | 5/2010 | Chiu | G06F 3/046 345/173 |
| 2011/0297457 | A1 | * | 12/2011 | Yeh | G06F 3/03545 178/19.01 |
| 2011/0310031 | A1 | * | 12/2011 | Harris | G06F 1/1616 345/173 |
| 2013/0009907 | A1 | * | 1/2013 | Rosenberg | G06F 3/046 345/174 |
| 2013/0106800 | A1 | * | 5/2013 | Yilmaz | G06F 3/03545 345/179 |
| 2013/0194242 | A1 | * | 8/2013 | Park | G06F 3/03545 345/179 |
| 2013/0257777 | A1 | * | 10/2013 | Benko | G06F 3/03545 345/173 |
| 2014/0062967 | A1 | * | 3/2014 | Lu et al. | 345/179 |
| 2014/0085269 | A1 | * | 3/2014 | Armstrong-Muntner | 345/179 |
| 2014/0118291 | A1 | * | 5/2014 | Fujii | 345/174 |
| 2014/0253464 | A1 | * | 9/2014 | Hicks | G06F 3/03545 345/173 |
| 2014/0292696 | A1 | * | 10/2014 | Son | G06F 3/03545 345/173 |

* cited by examiner

*Primary Examiner* — Dismery Mercedes (74) *Attorney, Agent, or Firm* — Shimokaji IP (57) ABSTRACT

A digitizing tablet is provided, comprising: a display surface with a digitizer which detects a location of a front tip of a digitizing stylus, a pen sensor configured to detect the digitizing stylus being placed flatly on the display surface and, in response, to transmit a detecting signal, and a controller electrically coupled to the pen sensor. The controller is configured to execute instructions for: receiving the detecting signal from the pen sensor; and placing the digitizing tablet into a suspend mode upon receipt of the detecting signal.

7 Claims, 10 Drawing Sheets

SUSPENDING TABLET COMPUTER BY STYLUS DETECTION

BACKGROUND OF THE INVENTION

The present invention relates generally to tablet computers and, more specifically, to placing the tablet computer into a suspended mode.

Digitizing tablet computers and devices (hereinafter "tablets") allow a user to use a digitizing stylus-type input device to interact with a surface of the tablet by drawing, writing, selecting, etc. Circuitry inside the tablet detects the stylus action and transmits appropriate commands to computing circuitry.

Tablets are typically turned off or placed in a sleep or suspend mode using a hard or soft switch. A user may also enter settings to allow the tablet to enter the suspend mode automatically after a predetermined time. Thus, to reduce power consumption when not using the tablet, a user must take an affirmative action to place the tablet in the suspend mode or wait for the tablet to do so automatically.

Therefore, it can be seen that there is a need for a more efficient way to place a tablet into its suspend mode.

SUMMARY

In one aspect, a digitizing tablet is provided, comprising: a display surface with a digitizer which detects a location of a front tip of a digitizing stylus; a pen sensor configured to detect the digitizing stylus being placed flatly on the display surface and, in response, transmits a detecting signal; and a controller electrically coupled to the pen sensor, the controller configured to execute instructions for: receiving the detecting signal from the pen sensor and placing the digitizing tablet into a suspend mode upon receipt of the detecting signal.

In another aspect, a digitizing tablet is provided, comprising: a display surface; and a controller electrically coupled to transmitting and receiving circuitry, the controller configured to execute instructions for: sending a command to the transmitting circuitry to transmit an electromagnetic wave; receiving a first message from the receiving circuitry; determining if the first message from the receiving circuitry is indicative of simultaneous detection of electromagnetic induction from two locations of the digitizing stylus; and placing the digitizing tablet into a suspend mode upon receipt of simultaneous detection of electromagnetic induction from the two locations of the digitizing stylus In another aspect, a digitizing tablet system is provided, comprising: a digitizing stylus, comprising: first capacitive-inductive (LC) circuitry in a first location of the digitizing stylus; and second LC circuitry in a second location of the digitizing stylus; and a digitizing tablet, comprising: a display; transmitting circuitry; receiving circuitry; a controller electrically coupled to the display and the transmitting and receiving circuitry; a processor within the controller; and a memory. The memory is configured to store instructions executable by the processor for: sending a command to the transmitting circuitry to transmit an electromagnetic wave; receiving a first message from the receiving circuitry; determining if the first message from the receiving circuitry is indicative of detection of electromagnetic induction from the first and second LC circuitries of the digitizing stylus; if the first message from the receiving circuitry is not indicative of detection of electromagnetic induction from the first and second LC circuitries of the digitizing stylus, waiting to receive a second message from the receiving circuitry; and if the first message from the receiving circuitry is indicative of simultaneous detection of electromagnetic induction from the first and second LC circuitries of the digitizing stylus, placing the digitizing tablet into a suspend mode.

In a further aspect, a computer program product stored on non-transitory computer readable media executable by a programmable processor is provided, the computer program product having computer readable code embodied therein and comprising instructions for: receiving a first message from receiving circuitry; determining if the first message from the receiving circuitry is indicative of simultaneous detection of electromagnetic induction from two locations of a digitizing stylus; if the first message from the receiving circuitry is not indicative of simultaneous detection of electromagnetic induction from the two locations of the digitizing stylus, waiting to receive a second message from the receiving circuitry; and if the first message from the receiving circuitry is indicative of simultaneous detection of electromagnetic induction from the two locations of the digitizing stylus, placing the digitizing tablet into a suspend mode.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide apparatus and methods for placing a digitizing tablet computer into a suspend or sleep mode. More specifically, exemplary embodiments provide a tablet and stylus-type input device that may allow the tablet to enter a suspend mode when the stylus is placed on the display surface of the tablet.

Figure 1:
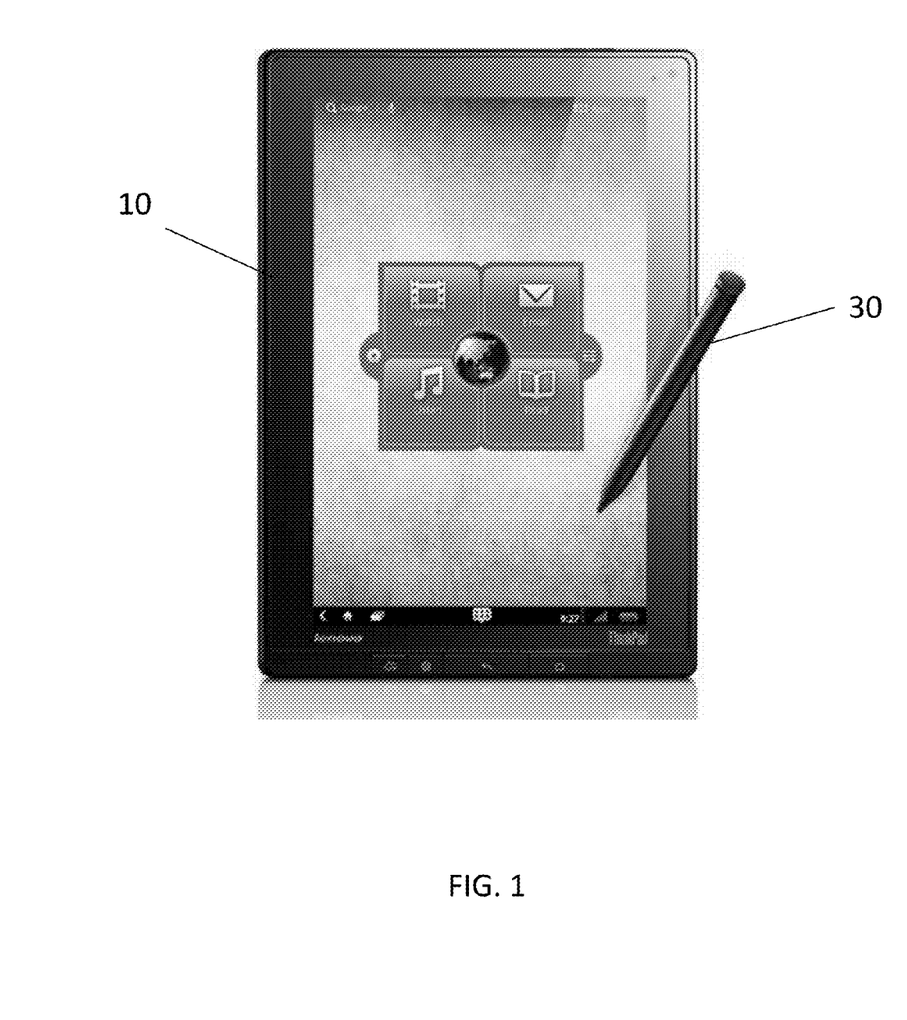
FIG. 1 is a top view of a stylus input tablet and digitizing stylus according to an exemplary embodiment.
Figure 2:
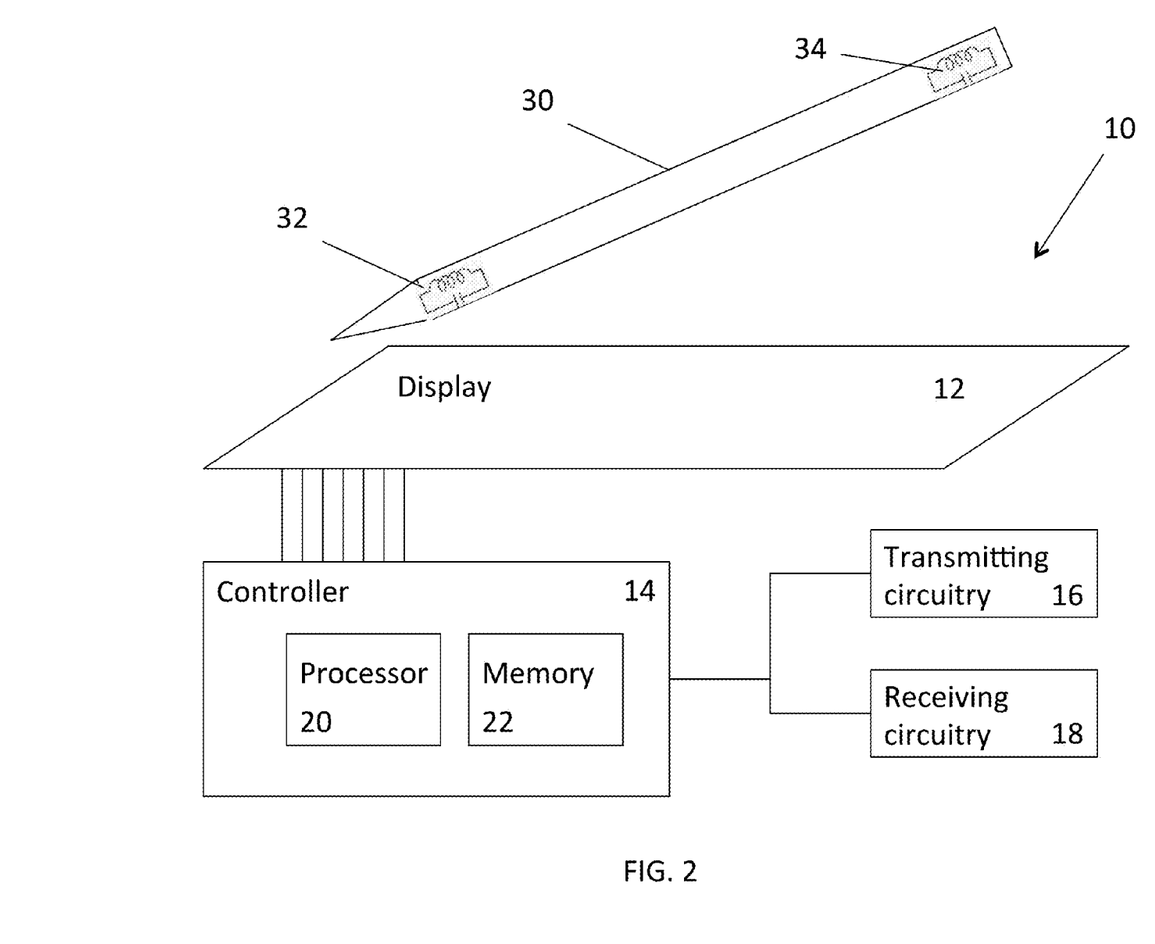
FIG. 2 is a block diagram of control circuitry of the tablet and stylus of FIG. 1 according to an exemplary embodiment.

FIG. 1 is a top view of a digitizing tablet computer ("tablet") 10 and a stylus-type input device ("stylus" or "pen") 30 according to an exemplary embodiment. As illustrated in FIG. 2, the tablet 10 may include a display surface 12, a controller 14, transmitting circuitry 16 and a pen sensor or receiving circuitry 18 electrically coupled to the controller 14. The controller 14 may include a processor 20 and a memory 22 configured to store computing instructions to be executed by the processor 20. The stylus 30 may include any type of circuitry that can detect and respond to the transmitting circuitry 16, such as passive capacitive-inductive (LC) circuitries 32 and 34 at two locations. In the FIGs., the LC circuitries 32, 34 are shown located in the front tip end and the back eraser end, respectively, of the stylus 30.

Figure 3:
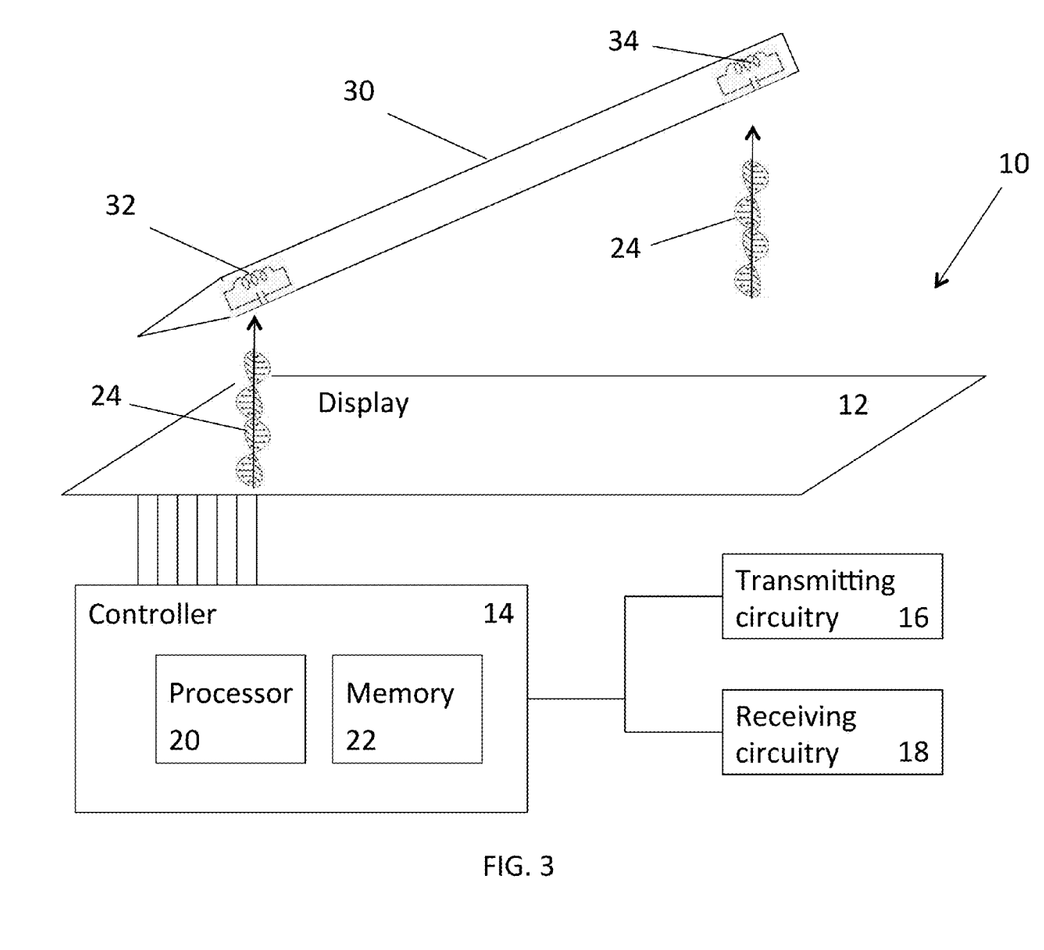
FIG. 3 is a block diagram of the control circuitry of FIG. 2 illustrating the tablet activating a radio frequency (RF) transmission.
Figure 4:
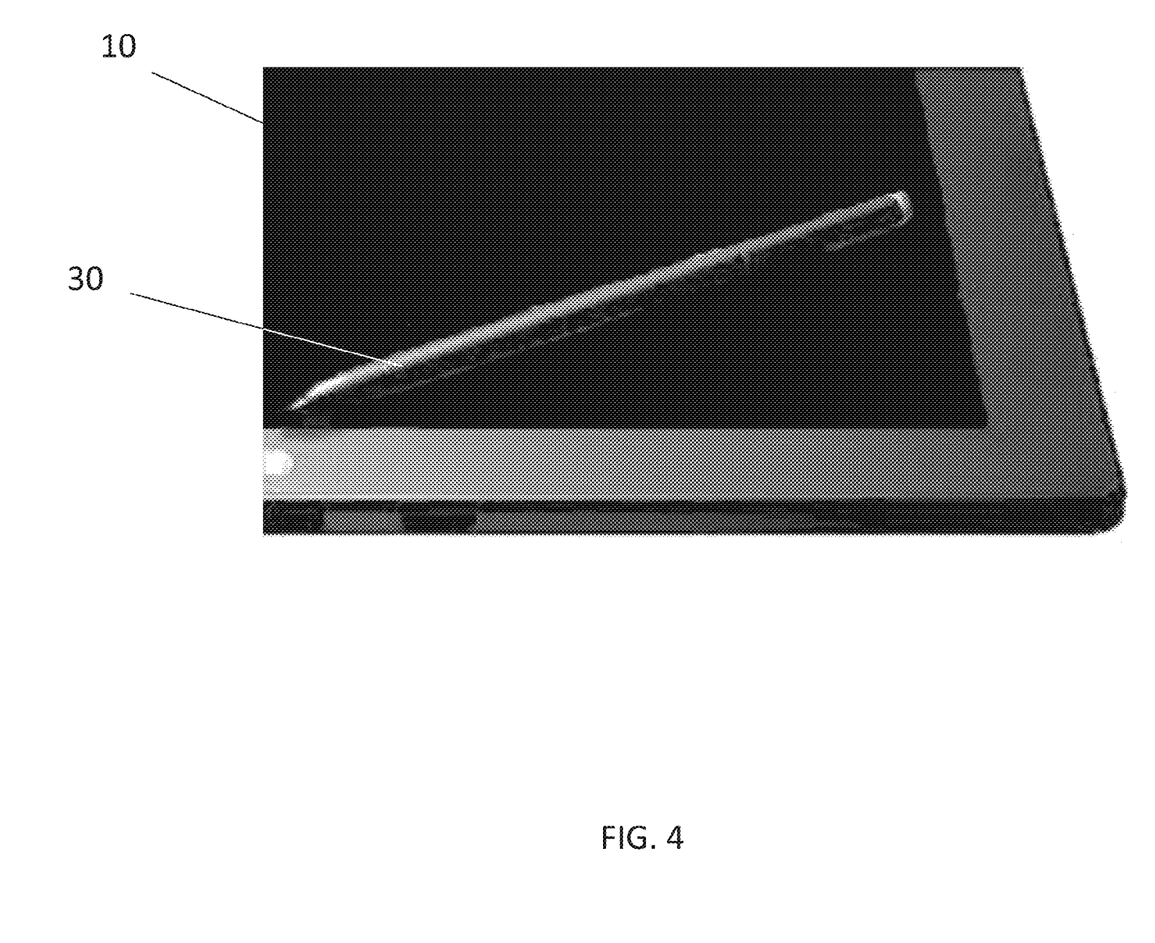
FIG. 4 is a side perspective view of the tablet and stylus of FIG. 1 with the stylus placed on the surface of the tablet.
Figure 5:
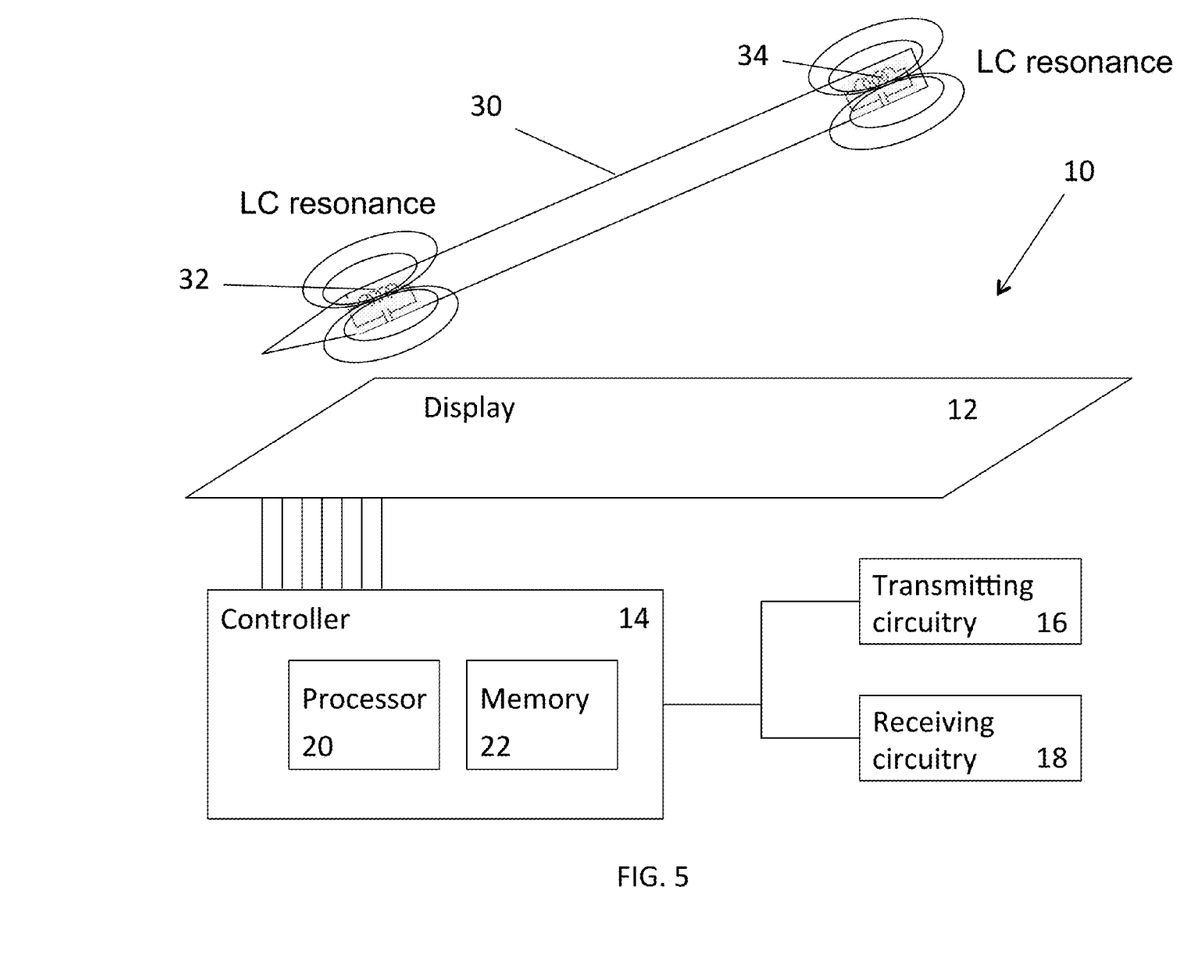
FIG. 5 is a block diagram of the control circuitry of FIG. 2 illustrating the response by the stylus to the RF transmission.
Figure 6:
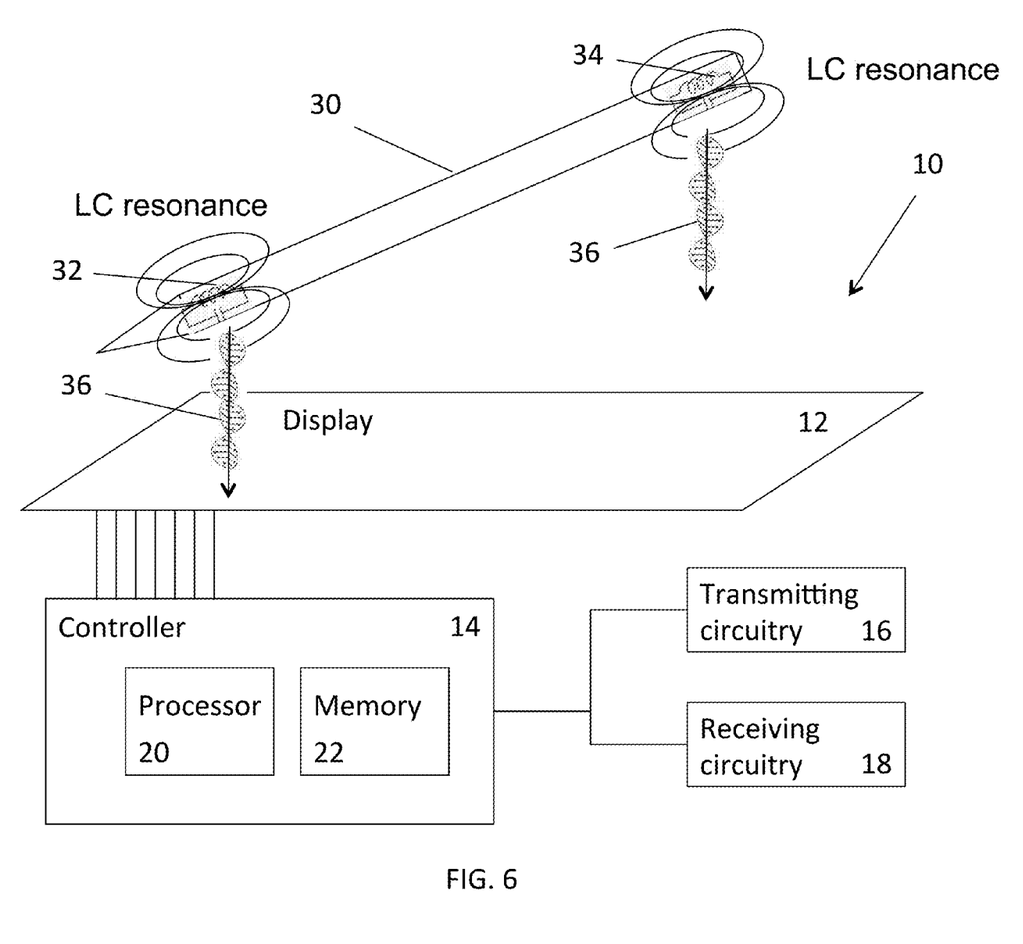
FIG. 6 is a block diagram of the control circuitry of FIG. 2 illustrating the tablet receiving electromagnetic induction from two locations on the stylus.

In operation, the controller 14 may transmit a command to the transmitting circuitry 16 to transmit an electromagnetic wave 24 (FIG. 3). When the stylus 30 is laid on the display surface 12 of the tablet 10 (FIG. 4), the LC circuitry 32 and 34 in the stylus 30 may both respond with LC resonance (FIG. 5) causing electromagnetic induction or waves 36 (FIG. 6). The electromagnetic induction 32 and 34 from both locations of the stylus 30 may be received by the pen sensor or receiving circuitry 18 in the tablet. The controller 14 may receive a detecting signal or message from the receiving circuitry 18 and terminate the transmission of the electromagnetic wave 24. If the controller 14 determines that the received message indicates that the receiving circuitry 18 doesn't detect electromagnetic induction 36 from both LC circuitries 32 and 34 simultaneously, such as if the stylus 30 is not on the surface 12, the controller 14 waits for another message from the receiving circuitry 18. Otherwise, if the controller 14 determines that the received message indicates that the receiving circuitry 18 detects electromagnetic induction 36 from both LC circuitries 32 and 34 simultaneously, indicating that the stylus 30 has been laid on the surface 12, the controller 14 may place the tablet 10 into a low power, suspend mode. Subsequently, when the controller 14 receives a message from the receiving circuitry 18, or stops transmitting the detecting signal, indicative of the absence of the detection of the electromagnetic induction 36 from one or both LC circuitries 32 and 34 because the stylus 30 has been removed from the surface 12, the controller 14 may wake the tablet and exits the suspend mode.

Figure 7:
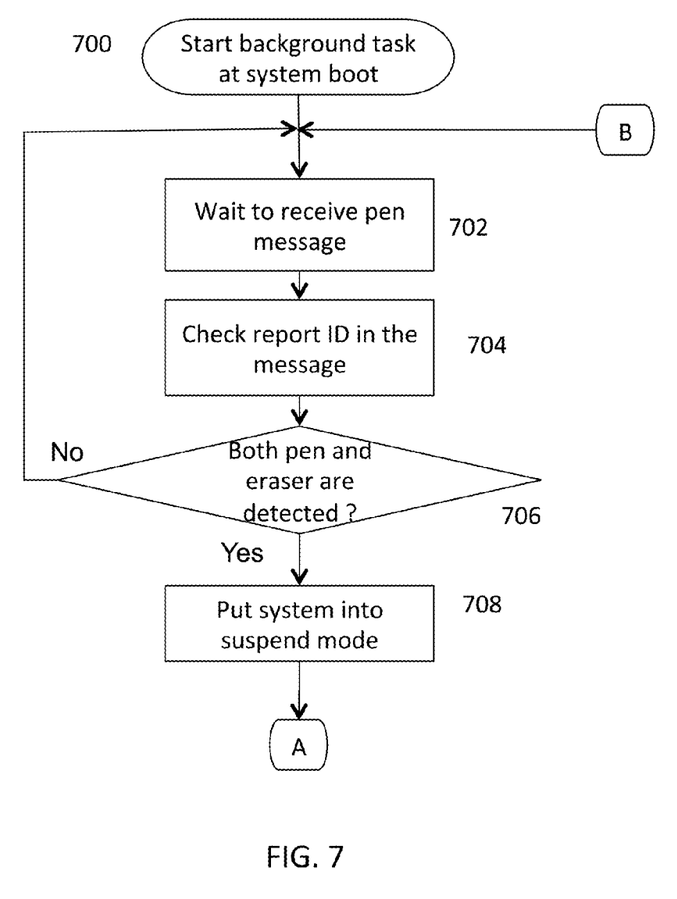
FIG. 7 is a flow chart of a method according to an exemplary embodiment.

Referring to the flowchart of FIG. 7, instructions stored in the memory 22 and executable by the processor 20 may begin by initiating a background task when the tablet controller 14 is booted (step 700). The controller 14 may wait to receive electromagnetic waves from the stylus 30 (step 702). When electromagnetic waves are received, the report identification (ID) may be checked (step 704) and a determination may be made whether the LC circuitry 32, 34 in both locations of the stylus 30 has been detected (step 706). If not, the controller 14 may continue to wait (step 702). If the LC circuitry 32, 34 in both locations of the stylus 30 has been detected (step 706), the controller 14 puts the tablet 10 into the suspend mode (708).

Figure 8:
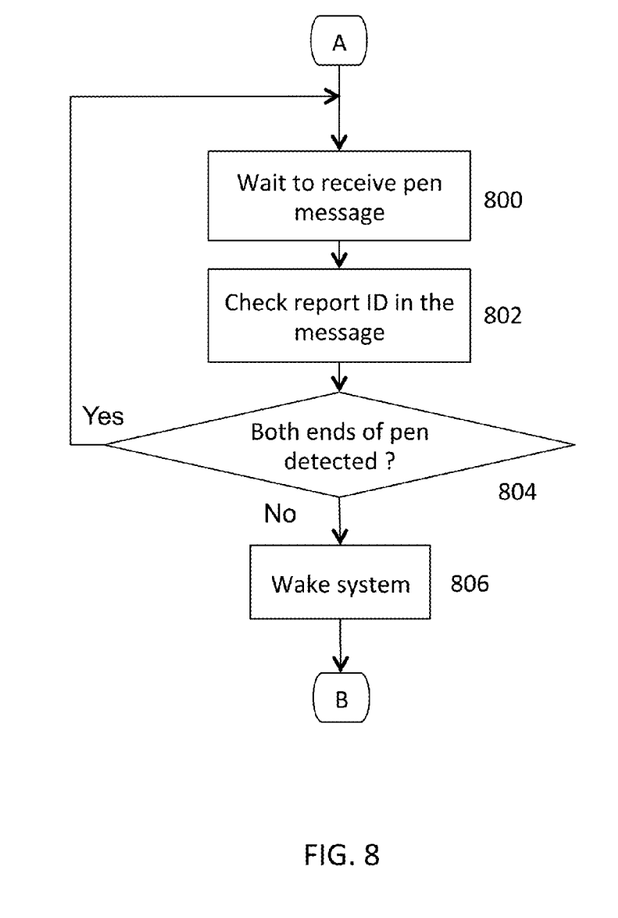
FIG. 8 is a flow chart of a method according to another exemplary embodiment.

In one embodiment (FIG. 8), while in the suspend mode (point A), the controller 14 continues to wait to receive a stylus-detect message (step 800). When a message is received, the report ID is checked (step 802) and a determination may be made whether the electromagnetic induction 36 from LC circuitry 32 and 34 from both locations of the stylus 30 continues to be detected (step 804). If so, as when the stylus 30 remains on the surface 12, the controller 14 may continue to wait (step 800). If the electromagnetic induction 36 from both locations of the stylus 30 has not been detected (step 804), as when the stylus 30 has been removed from the display surface 12, the controller 14 wakens the tablet 10 from the suspend mode (806) and the controller 14 returns (point B) to waiting for a stylus message (FIG. 7, step 702).

When the tablet 10 is in a slanted position, for example being laid on a slanting tablet stand on a desk, the stylus 30 may roll off of the display surface 12 once after the stylus 30 is placed flatly on the display surface 12. In a further variation of the embodiment, the controller 14 detects whether the stylus 30 has been removed from the display surface 12 by a user, or the stylus 30 has rolled out from the display surface 12. The controller 14 continuously monitors position change of the electromagnetic induction 36 from both location of the stylus 30. When the electromagnetic induction 36 from both location of the stylus 30 is lost after approaching an edge of the display surface, the controller 14 may determine that the stylus 30 has rolled off of the display surface 12, and the controller 14 does not waken the tablet 10 from the suspend mode.

Figure 9:
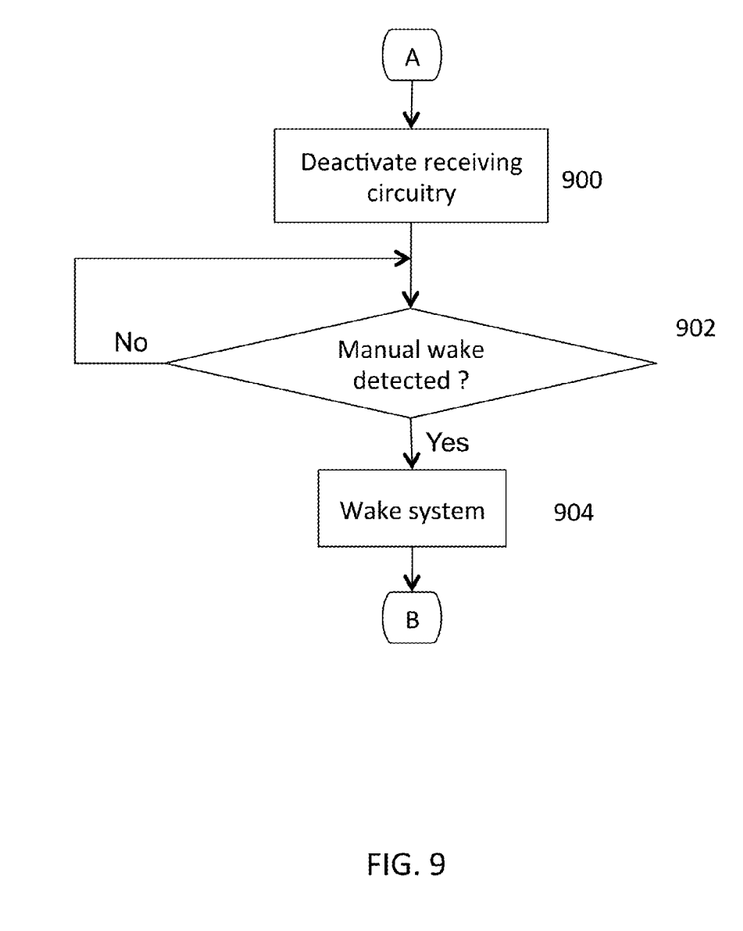
FIG. 9 is a flow chart of a method according to still another exemplary embodiment.

In another embodiment (FIG. 9), once the tablet 10 has been placed in the suspend mode by detecting that the stylus 30 is against the display surface 12, the controller 14 may deactivate the receiving circuitry 18 or otherwise ignore signals from the receiving circuitry 18 so that the stylus 30 may be removed without causing the tablet 10 to waken. Thus, if the tablet 10 is being held at an angle, the user may touch the stylus 30 to the display 12 to trigger the suspend mode (point A). The controller 14 may deactivate the receiving circuitry 18 (step 900). When a manual wake signal is detected by the controller 14 (step 902), such as when the user presses the power switch, the controller 14 may wake the tablet 10 from the suspend mode (904) and the controller 14 returns (point B) to waiting for a stylus message (FIG. 7, step 702). In this manner, the user may remove the stylus 30 from the display surface 12 without having to hold or lay the tablet 10 in a horizontal position to keep the stylus 30 from rolling off of the display surface 12.

In another embodiment, the tablet 10 may include a pressure-sensitive touch panel, which detects the area of touching object by detecting the pressure given by the touching object.

Figure 10:
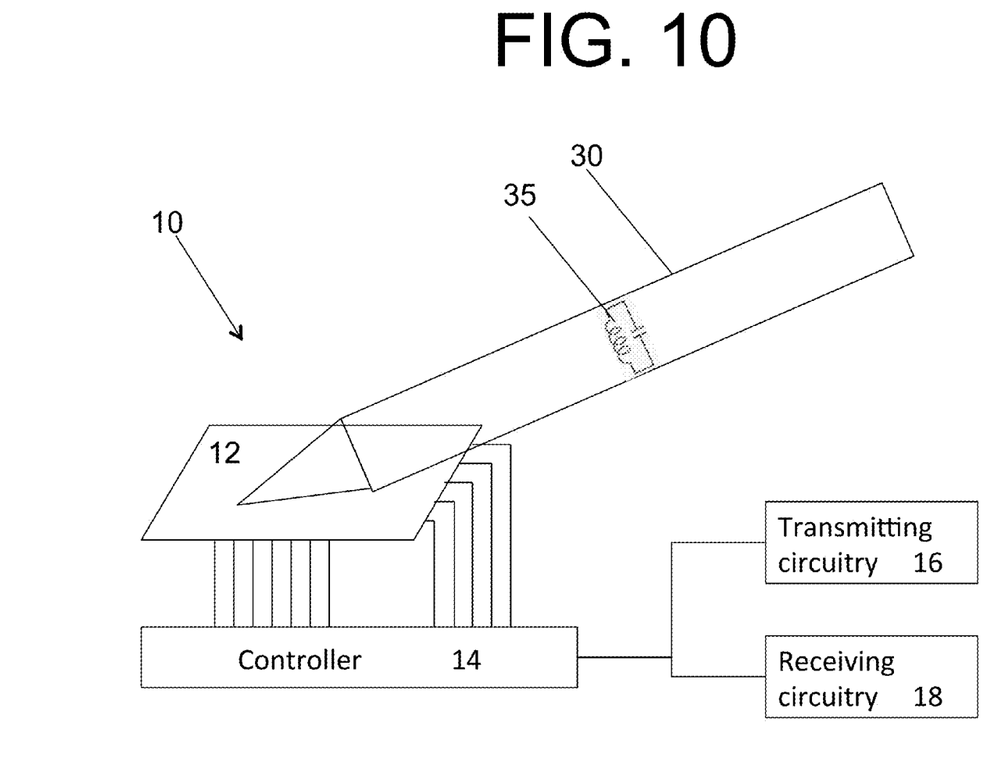
FIG. 10 is another block diagram of the control circuitry of the tablet and stylus of FIG. 1 according to an exemplary embodiment.

In an alternative embodiment (FIG. 10), the stylus 30 may include a passive capacitive-inductive (LC) circuitry 35 in the middle of a rod of the stylus 30. In operation, when the stylus 30 is laid flat on the display surface 12 of the tablet 10, the LC circuitry 35 in the middle of the stylus 30 may respond with LC resonance causing electromagnetic induction. The electromagnetic induction from the middle location of the stylus 30 may be received by the receiving circuitry 18 in the tablet 10. The controller 14 may receive a signal or message from the receiving circuitry 18. If the controller 14 determines that the received message indicates that the receiving circuitry 18 does not detect electromagnetic induction from the LC circuitry 35, the controller 14 waits for another message from the receiving circuitry 18. Otherwise, if the controller 14 determines that the received message indicates that the receiving circuitry 18 detects electromagnetic induction from the LC circuitry 35, indicating that the stylus 30 has been laid on the display surface 12, the controller 14 may place the tablet 10 into a low power, suspend mode.

It is important to note that while the present invention has been described in the context of a fully functioning system, those of ordinary skill in the art will appreciate that the processes of the present invention are capable of being distributed in the form of a non-transitory computer readable storage medium of instructions and a variety of forms and that the present invention applies regardless of the particular type of storage media actually used to carry out the distribution.

It should be understood, of course, that the foregoing relate to exemplary embodiments of the invention and that modifications may be made without departing from the spirit and scope of the invention as set forth in the following claims.

We claim:

1. A digitizing tablet, comprising:
   a display surface with a digitizer which detects a digitizing stylus;
   a pen sensor configured to detect simultaneous or non-simultaneous electromagnetic induction from a first circuitry in a first location and a second circuitry in a second location in the digitizing stylus; and
   a controller coupled to the pen sensor, the controller configured to execute instructions for:
      receiving a suspend signal from the pen sensor when the pen sensor detects simultaneous electromagnetic induction;
      receiving a wake signal from the pen sensor when the pen sensor detects non-simultaneous electromagnetic induction or fails to detect any electromagnetic induction;
      placing the digitizing tablet into a suspend mode upon receipt of the suspend signal;
      placing the digitizing tablet into a wake mode upon receipt of the wake signal.

2. The digitizing tablet of claim 1, wherein the controller is further configured to execute instructions for waking the digitizing tablet from the suspend mode if the pen sensor stops transmitting the suspend signal.

3. The digitizing tablet of claim 1, wherein the controller is further configured to execute instructions for waking the digitizing tablet from the suspend mode upon receipt of a signal from a user-operated switch.

4. The digitizing tablet of claim 1, wherein the controller is further configured to execute instructions for:
   deactivating the pen sensor after placing the digitizing tablet in the suspend mode; and
   waking the digitizing tablet from the suspend mode upon receipt of a signal from a user-operated switch.

5. A digitizing tablet system, comprising:
   a digitizing stylus;
   a digitizing tablet in electromagnetic communication with the digitizing stylus, wherein the tablet, in a suspend mode:
   determines whether the stylus has rolled off a display surface of the tablet without user interaction,
      by continuously monitoring position change of electromagnetic induction from a first circuitry in a first location and a second circuitry in a second location in the stylus while the tablet is in the suspend mode; and
      when electromagnetic induction from the first and second locations is lost after the stylus approaches an edge of the display surface of the tablet, determining that the stylus has rolled off the display surface;
   remains in suspend mode when the tablet determines that the stylus has rolled off the display surface.

6. A computer program product stored on non-transitory computer readable media executable by a programmable processor, the computer program product having computer readable code embodied therein and comprising instructions for:
   receiving a first message from a receiving circuitry in a tablet in a suspend mode, wherein the first message is based on the receipt of electromagnetic induction from one or both of a first circuitry in a first location and a second circuitry in a second location of a stylus;
   determining if the first message from the receiving circuitry is indicative of a digitizing stylus being against a display surface based on simultaneous electromagnetic induction from both locations of the stylus;
   if the first message from the receiving circuitry is indicative of the digitizing stylus being against a display surface, deactivating the receiving circuitry so that the stylus can be removed from the display surface without causing the display surface to awaken.

7. The computer program product of claim 6, wherein the computer program controller further comprises instructions for waking the digitizing tablet from the suspend mode upon receipt of a signal from a user-operated switch.

* * * * *